(12) United States Patent  
Schwesig

(10) Patent No.: US 7,987,970 B2
(45) Date of Patent: Aug. 2, 2011

(54) ROLLER DRIVE FOR A CONVEYOR SYSTEM AND CONVEYOR SYSTEM

(75) Inventor: Günter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 130 days.

(21) Appl. No.: 12/519,967

(22) PCT Filed: Dec. 17, 2007

(86) PCT No.: PCT/EP2007/064029
§ 371 (c)(1),
(2), (4) Date: Jun. 18, 2009

(87) PCT Pub. No.: WO2008/074761
PCT Pub. Date: Jun. 26, 2008

(65) Prior Publication Data
US 2010/0072031 A1    Mar. 25, 2010

(30) Foreign Application Priority Data
Dec. 19, 2006    (DE) .......................... 10 2006 060 009

(51) Int. Cl.
*B65G 13/06*    (2006.01)

(52) U.S. Cl. ........................................ 198/788; 198/789
(58) Field of Classification Search .................. 198/788, 198/789, 780
See application file for complete search history.

(56) References Cited

U.S. PATENT DOCUMENTS

| 6,244,427 B1 * | 6/2001 | Syverson ...................... 198/788 |
| 2002/0060140 A1 * | 5/2002 | Nakamura et al. ............ 198/788 |
| 2009/0166157 A1 * | 7/2009 | Kratz et al. .................... 198/788 |

FOREIGN PATENT DOCUMENTS

| DE | 149 648 | 3/1904 |
| DE | 11 33 670 B | 7/1962 |
| DE | 199 02 837 C1 | 8/2000 |
| DE | 203 19 969 U1 | 3/2004 |
| DE | 103 24 664 A1 | 12/2004 |
| DE | 10 2004 032 005 A1 | 1/2005 |
| DE | 60 109 874 T2 | 3/2006 |
| WO | WO 2004 107531 A | 12/2004 |

* cited by examiner

*Primary Examiner* — James R Bidwell

(57) ABSTRACT

A roll drive for driving a drive roller of a conveyor system has a stator which is arranged on a shaft and has a plurality of windings for generating a magnetic field, and a rotor which is arranged around the stator and is connected to a roller tub of the drive roller. A thermally conducting element is provided on the end side of the stator for dissipation of the heat which is produced during operation of the roll drive.

18 Claims, 2 Drawing Sheets

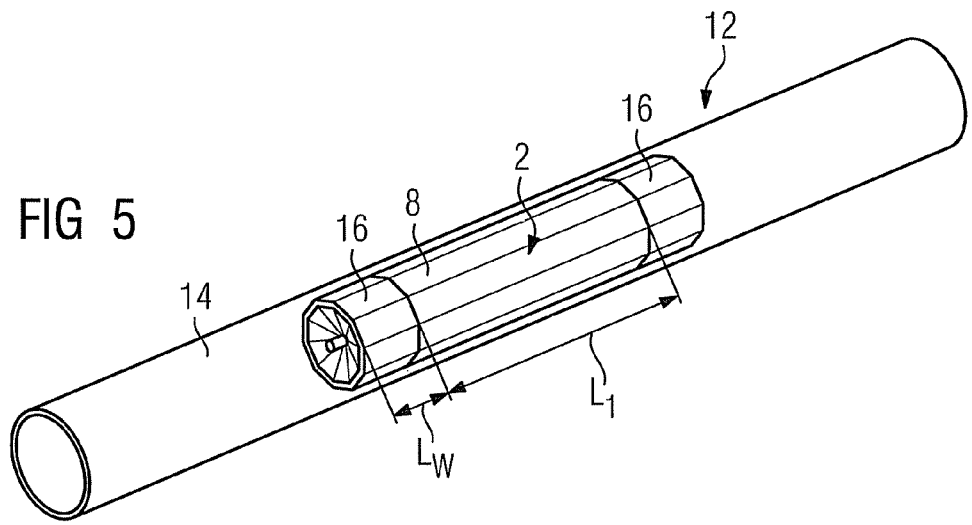
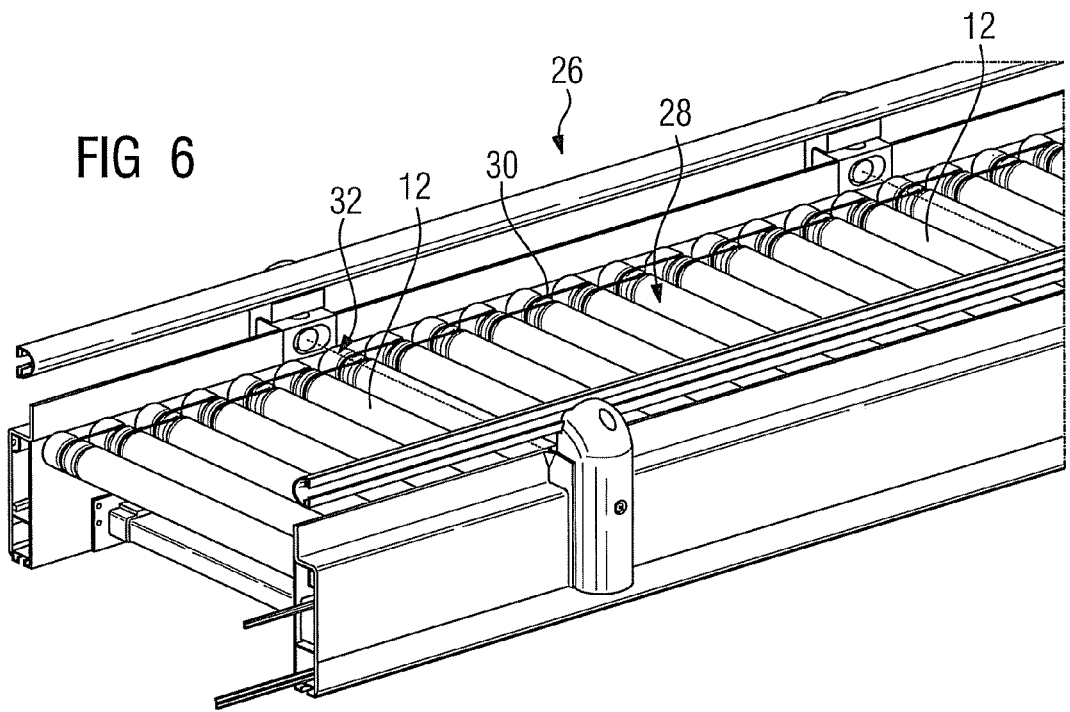

ROLLER DRIVE FOR A CONVEYOR SYSTEM AND CONVEYOR SYSTEM

CROSS REFERENCE TO RELATED APPLICATIONS

This application is the US National Stage of International Application No. PCT/EP2007/064029 filed Dec. 17, 2007 and claims the benefit thereof. The International Application claims the benefits of German Patent Application No. 10 2006 060 009.6 DE filed Dec. 19, 2006, both of the applications are incorporated by reference herein in their entirety.

FIELD OF INVENTION

The invention relates to a roller drive for driving a drive roller of a conveyor system and a conveyor system.

BACKGROUND OF INVENTION

Conveyor systems comprising a number of rollers disposed parallel to one another and connected to one another by belts are used widely in industry to convey goods. Some of the rollers in the conveyor system, so-called drive rollers, contain an electric motor as part of a roller drive, with the aid of which a rotational movement of the drive roller is generated.

The roller drive generally comprises a hollow rotor with permanent magnets, in which a fixed stator made from an iron core and having a number of windings is disposed. For its part the rotor is connected to an external roller tube of the drive roller, so that the roller tube is rotated with the rotor during operation of the roller drive.

During operation the electrical power loss of the roller drive generates heat, which heats the roller tube by way of which the goods are transported. The heat is emitted to the surroundings and thus to the goods transported by means of the conveyor system by way of the roller tube. To prevent damage to the goods, only a limited increase in the temperature of the roller tube is permitted, for example from approximately 40 to 50 Kelvin.

The roller drive is generally positioned in the center of the drive roller and its length is approximately 25% to 50% of the length of the roller tube. This produces an irregular temperature distribution on the roller tube surface. In the region of the heated roller drive the roller tube assumes a significantly higher temperature than in the outer regions away from the roller drive, since the thermal conduction of the roller tube, which is made of steel, is poor. The roller tube cannot be made from a material with better thermal conduction properties, such as aluminum or copper for example, as it is used for the magnetic shunt for the flux of the permanent magnets of the rotor and therefore has to be made from a magnetizable material, such as steel for example.

There are currently measures for eliminating some of the heat generated in the roller drive, for example by way of a heat tube or heat pipe, which is filled with a heat transfer medium. However such a heat pipe requires a greater shaft diameter in the motor shaft so the diameter of the stator has to be reduced. This leaves less space for the iron core or for the windings, resulting in a reduction in torque.

SUMMARY OF INVENTION

The roller drive integrated in the drive roller should generally output the highest possible torque, the torque being a function of the dimensions of the roller drive or roller tube (diameter, length, wall thickness). However a desired increase in torque cannot be achieved by enlarging the dimensions of the roller drive, as enlarging the roller drive would result in a greater power loss for the roller drive.

An object of the invention is to allow an increase in the torque of a drive roller without exceeding a maximum permissible temperature.

According to the invention the object is achieved by a roller drive for driving a drive roller of a conveyor system, comprising a stator with a number of windings disposed on a shaft to generate a magnetic field and a rotor disposed around the stator, which can be connected to a roller tube of the drive roller, with a thermally conducting element being provided on the end face of the stator, which is in direct contact with the stator.

The invention is based on the consideration that it is possible to increase the torque of the drive roller, if the heat emitted by the roller drive is distributed as regularly as possible in the roller tube. This allows a high level of heat emission to be achieved over the entire length of the roller tube where possible, so that despite the greater torque the temperature of the roller tube does not exceed the maximum permitted temperature at any point. A particularly good temperature distribution is present in that the heat generated by the roller drive is emitted to the roller tube over the largest possible region along the drive roller. The thermally conducting element is provided for this purpose, being connected to the roller drive and at least partially filling the hollow space within the roller tube. Some of the heat from the roller drive is induced into the thermally conducting element in this process, with the heat being emitted from there by way of thermal radiation to the roller tube. The thermally conducting element here is a stationary component, which is only in direct contact with the stator and is separated from the rotating roller tube by way of an air gap. The thermally conducting element therefore represents an extension of the roller drive, with the aid of which the heat is emitted over a longer distance in the longitudinal direction of the drive roller to the roller tube and is thus distributed more evenly.

According to one preferred embodiment the thermally conducting element has an end surface, with which it is in full-surface, thermally conducting contact with the end face of the stator. This full-surface contact between the thermally conducting element and the stator results in a very intensive heat transfer, so that the biggest possible portion of the heat generated in the roller drive is dissipated by way of the thermally conducting element.

According to a further preferred embodiment the thermally conducting element is connected by way of a thermally conducting casting compound to the stator and in particular to winding heads, in which the power loss occurs. A casting compound on the one hand allows the thermally conducting element to be secured reliably to the roller drive. A casting compound has also proven particularly advantageous, particularly where the roller drive has an uneven end face, as the casting compound fills the gaps between the profiled end face of the stator and the end surface of the thermally conducting element, thereby improving the heat transfer between the roller drive and the thermally conducting element. The casting compound used is for example a tough compound or a hardenable compound, in particular an adhesive, with good thermal conductivity.

Dissipation of the heat generated in the roller drive can also be increased by configuring the thermally conducting element in such a manner that it emits as much heat as possible to the surroundings. The thermally conducting element here has a cutout in the manner of a cone preferably inside the end surface in the direction of an opposing end face. The conical cutout enlarges the surface of the thermally conducting element, thereby increasing the quantity of heat emitted to the surroundings in the form of thermal radiation. Such a cutout also allows savings to be made on materials, resulting in a particularly economical embodiment.

The thermally conducting element is preferably roughly cylindrical. With this embodiment the shape of the thermally conducting element is tailored particularly well to the shape of the roller tube, resulting in a regular heat transfer. In particular the thermally conducting element is disposed concentrically in relation to the roller tube, so that the heat radiated from the thermally conducting element is distributed regularly in the radial direction.

The thermally conducting element advantageously comprises a cylindrical lateral surface, which has an external diameter that is only a degree of tolerance smaller than an internal diameter of the roller tube. The degree of tolerance is defined in such a manner here that the smallest possible gap results between the lateral surface of the thermally conducting element and an inner face of the roller tube, by way of which the heat of the thermally conducting element is emitted in the form of thermal radiation to the roller tube. At the same time the degree of tolerance is dimensioned in such a manner that the gap between the lateral surface of the thermally conducting element and the roller tube is sufficiently large to prevent contact between the thermally conducting element and the roller tube and thus to prevent friction during rotation of the roller tube. The external diameter of the thermally conducting element corresponds in particular to that of the rotor, so that the thermally conducting element represents a sort of axial extension of the roller drive.

For fast distribution of heat within the thermally conducting element the latter is preferably made of a material characterized by a thermal conductivity greater than 100 W/(m·K) and in particular greater than 150 W/(m·K). The thermally conducting element is made from aluminum, copper or magnesium for example or from an alloy with a high proportion of aluminum, copper and/or magnesium.

Thermally conducting elements are preferably disposed on both sides of the stator for a particularly regular heat distribution.

The length of the thermally conducting element is preferably greater than 15% and in particular greater than 20% of the length of the stator to allow a large transfer of heat to the roller tube. The length of the thermally conducting element is tailored in particular to the existing space with longer thermally conducting elements being able to absorb more heat and resulting in better heat distribution in the drive roller.

According to the invention the object is also achieved by a conveyor system with a roller drive as claimed in the claims. The advantages and preferred embodiments detailed for the roller drive can also be applied correspondingly to the conveyor system.

BRIEF DESCRIPTION OF THE DRAWINGS

Exemplary embodiments of the invention are described in more detail below with reference to the schematic diagrams in a drawing, in which:

FIG. 5 shows a view through a drive roller with a roller drive having two thermally conducting elements, and FIG. 6 shows a sectional perspective view of a conveyor system.

Identical reference characters have an identical meaning in the various figures.

DETAILED DESCRIPTION OF INVENTION

Figure 1:
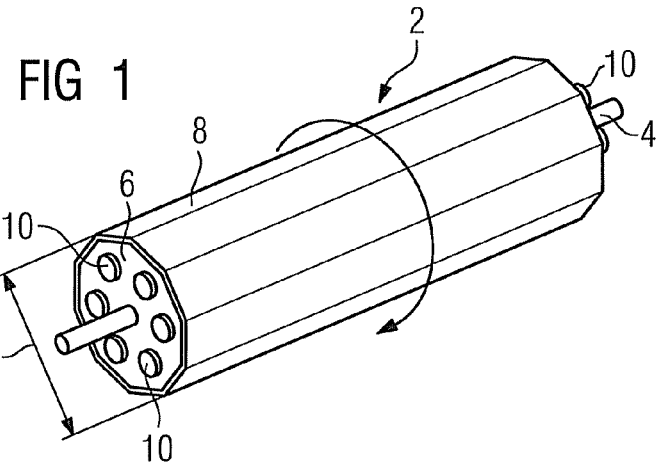
FIG. 1 shows a perspective view of a roller drive.
Figure 2:
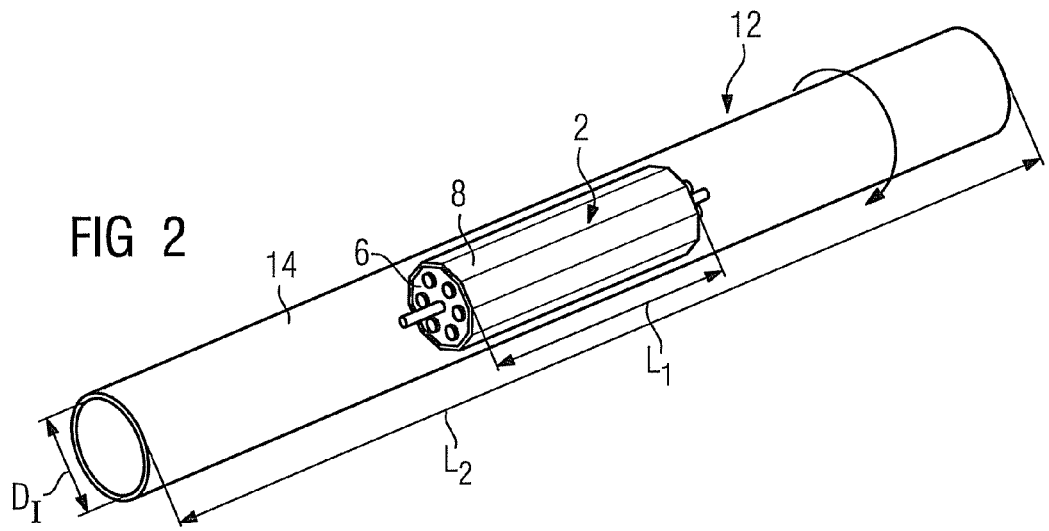
FIG. 2 shows a view through a drive roller with an integrated roller drive.

FIG. 1 shows a roller drive 2, which essentially comprises a stator 6 disposed on a shaft 4 and a rotor 8 enclosing the stator 6. The fixed stator 6 is made from an iron core, in which a number of windings 10 are disposed. The rotor 8 is disposed around the stator 6 in such a manner that it can rotate freely about the stator 6 as a result of the magnetic forces generated by the windings 10. The rotor 8 has an external diameter $D_R$, which defines the diameter of the roller drive 2.

The roller drive 2 is deployed to drive a drive roller 12, which is part of a conveyor system (not shown in detail here). The drive roller 12 also comprises a roller tube 14, in which the roller drive 2 is positioned centrally in respect of a length $L_2$ of the roller tube 14. The rotor 8 is connected by way of securing means (not shown in detail here) to the roller tube 14, so that during operation of the roller drive 2 the rotation of the rotor 8 also causes the roller tube 14 to rotate. The roller tube 14 has an internal diameter $D_I$, which is slightly larger than the external diameter $D_R$ of the rotor 8.

The length $L_1$ of the roller drive 2 is generally roughly between 25% and 50% of the length $L_2$ of the roller tube 14. In this exemplary embodiment the length $L_1$ is 30% of the length $L_2$ of the roller tube 14.

Figure 3:
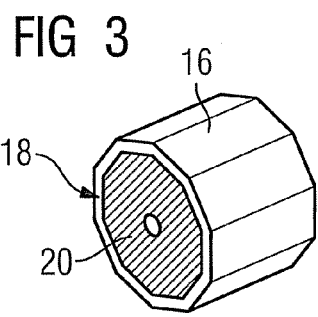
FIG. 3 shows a perspective view of an end surface of a thermally conducting element.
Figure 4:
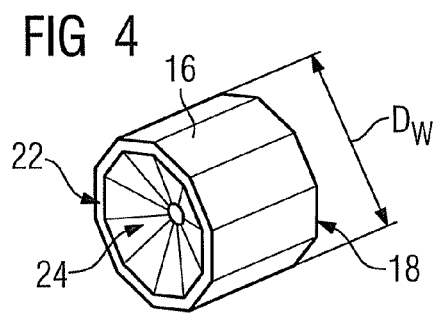
FIG. 4 shows a perspective view of an end face of the thermally conducting element according to FIG. 3.

A thermally conducting element 16, as shown in FIG. 3 and FIG. 4, is provided for effective dissipation of the heat that forms in the stator 6 during operation of the roller drive 2. The thermally conducting element 16 is roughly cylindrical and has a diameter $D_W$, which corresponds roughly to the diameter $D_R$ of the rotor 8. The thermally conducting element is made from aluminum and/or copper.

The thermally conducting element 16 has an end surface 18, with the aid of which it is in full-surface, thermally conducting contact with the end face of the stator 6. In this exemplary embodiment the thermally conducting contact is effected by way of a casting compound 20, which fills a recess (not shown in detail here) in the end surface 20. In this process contact is only established between the stator 6 and the thermally conducting element 16 by way of the casting compound 20, so the thermally conducting element 16 remains in a fixed position during operation of the roller drive 2. Contact between the thermally conducting element 16 and the rotor 8 is prevented so as not to have an adverse effect on the rotation of the rotor 8.

The thermally conducting element 16 has a cutout 24 in the manner of a cone, as shown in FIG. 4, on the inside starting from the end surface 18 in the direction of an end face 22. The cutout 24 on the one hand represents a saving on materials and also serves to enlarge the surface of the thermally conducting element 16, allowing more heat to be emitted to the surroundings.

A drive roller 12 in the assembled state, in which a roller drive 2 with two thermally conducting elements secured to its end face is disposed within a roller tube 14, is shown in FIG. 5. Because the diameter $D_W$ of the thermally conducting elements 16 corresponds to that of the rotor 8, the diameter $D_W$ is only a degree of tolerance smaller than the internal diameter $D_I$ of the roller tube 14. A very small gap is thus formed between the thermally conducting element 16 and the roller tube 14, by way of which gap heat from the thermally conducting element 16 is emitted in the form of thermal radiation to the roller tube 14.

The length $L_W$ of each of the thermally conducting elements 16 in this exemplary embodiment is roughly 30% of the length $L_1$ of the roller drive 2. The thermally conducting elements 16 thus represent an extension of the roller drive 2, so that the dissipated heat induced into the thermally conducting elements can be better distributed in the interior of the roller tube 14. This in particular allows a torque increase with which a predetermined permissible temperature of the roller tube 6 is not exceeded due to the regular distribution of the dissipated heat.

FIG. 6 shows a conveyor system 26 for conveying goods (not shown), comprising a number of rollers 12, 28 disposed parallel to one another. The rollers are either configured in the manner of drive rollers 12 or are idler rollers 28, which essentially only comprise a roller tube. The rollers 12, 28 are connected to one another by way of belts 30, so that the rotational movement of the drive rollers 12 is transmitted to the idler rollers 28. Light barriers 32 are also provided to capture the position of goods.

The invention claimed is:

1. A roller drive for driving a drive roller of a conveyor system, comprising:
    a stator with a plurality of windings disposed on a shaft to generate a magnetic field;
    a rotor disposed around the stator, the rotor being connected to a roller tube of the drive roller; and
    a thermally conducting element provided on the end face of the stator, the thermally conducting element being in direct contact with the stator,
    wherein the thermally conducting element is connected to the stator by way of a thermally conducting casting compound.

2. The roller drive as claimed in claim 1, wherein the thermally conducting element has an end surface with which it is in full-surface, thermally conducting contact with the end face of the stator.

3. The roller drive as claimed in claim 2, wherein the thermally conducting element has a cutout in the manner of a cone inside the end surface in the direction of an opposing end face.

4. The roller drive as claimed in claim 1, wherein the thermally conducting element has a cutout in the manner of a cone inside the end surface in the direction of an opposing end face.

5. The roller drive as claimed in claim 1, wherein the thermally conducting element is roughly cylindrical.

6. The roller drive as claimed in claim 1, wherein the thermally conducting element comprises a cylindrical lateral surface, which has an external diameter that is only a degree of tolerance smaller than an internal diameter of the roller tube.

7. The roller drive as claimed in claim 1, wherein two thermally conducting elements are disposed on both sides of the stator.

8. The roller drive as claimed in claim 1, wherein a length of the thermally conducting element is greater then 15% and in particular greater than 20% of the length of the stator.

9. A roller drive for driving a drive roller of a conveyor system, comprising:
    a stator with a plurality of windings disposed on a shaft to generate a magnetic field;
    a rotor disposed around the stator, the rotor being connected to a roller tube of the drive roller; and
    a thermally conducting element provided on the end face of the stator, the thermally conducting element being in direct contact with the stator,
    wherein thermally conducting element is made from a material with a thermal conductivity >100 W/(m·K) and in particular >150 W/(m·K).

10. A conveyor system with a drive roller having a roller drive, comprising:
    a stator with a plurality of windings disposed on a shaft to generate a magnetic field;
    a rotor disposed around the stator, the rotor being connected to a roller tube of the drive roller; and
    a thermally conducting element provided on the end face of the stator, the thermally conducting element being in direct contact with the stator,
    wherein the thermally conducting element is connected to the stator by way of a thermally conducting casting compound.

11. The conveyor system as claimed in claim 10, wherein the thermally conducting element has an end surface with which it is in full-surface, thermally conducting contact with the end face of the stator.

12. The roller drive as claimed in claim 11, wherein the thermally conducting element has a cutout in the manner of a cone inside the end surface in the direction of an opposing end face.

13. The roller drive as claimed in claim 11, wherein the thermally conducting element has a cutout in the manner of a cone inside the end surface in the direction of an opposing end face.

14. The roller drive as claimed in claim 10, wherein the thermally conducting element is roughly cylindrical.

15. The roller drive as claimed in claim 10, wherein the thermally conducting element comprises a cylindrical lateral surface, which has an external diameter that is only a degree of tolerance smaller than an internal diameter of the roller tube.

16. The roller drive as claimed in claim 10, wherein the thermally conducting element is made from a material with a thermal conductivity >100 W/(m·K) and in particular >150 W/(m·K).

17. The roller drive as claimed in claim 10, wherein two thermally conducting elements are disposed on both sides of the stator.

18. The roller drive as claimed in claim 10, wherein a length of the thermally conducting element is greater then 15% and in particular greater than 20% of the length of the stator.

* * * * *